United States Patent [19]

Lang et al.

[11] 3,927,819

[45] Dec. 23, 1975

[54] METHOD OF TREATING THE CORNERS OF PLANAR POLYGONAL WORKPIECES

[75] Inventors: Joseph Lang, Wurttemberg, Upper Palatinate; Helmut Meckenstock, Waltrop; Hans-Joachim Nopper, Oberkoplitz, all of Germany

[73] Assignee: Flachglas Aktiengesellschaft Delog-Detag, Gelsenkirchen, Germany

[22] Filed: July 15, 1974

[21] Appl. No.: 488,772

Related U.S. Application Data

[62] Division of Ser. No. 402,577, Oct. 1, 1973.

[52] U.S. Cl. .................. 228/212; 198/19; 198/237; 228/6; 228/38; 228/47
[51] Int. Cl.² ........................................ B23K 37/04
[58] Field of Search .............. 228/6, 36, 37, 38, 47, 228/49; 29/484; 198/19, 236, 237, 286

[56] References Cited
UNITED STATES PATENTS

| | | | |
|---|---|---|---|
| 410,761 | 9/1889 | Livingston et al. | 228/38 |
| 2,114,351 | 4/1938 | Lindner | 198/237 |
| 3,071,258 | 1/1963 | Seigh et al. | 198/237 X |

Primary Examiner—Francis S. Husar
Assistant Examiner—Gus T. Hampilos
Attorney, Agent, or Firm—Karl F. Ross; Herbert Dubno

[57] ABSTRACT

A planar workpiece of polygonal outline, such as a metal frame for use as a spacer in thermally insulating glass is stood on its edge and transported to a manipulator which tilts the workpiece about a horizontal axis to position one of its corners in a treatment location where it can be, for instance, soldered or brazed. Thereafter the workpiece is tilted over and set on an edge and either transported away to another such treatment location or positioned with its next corner in the same treatment location. The manipulator which tilts the workpiece in an upright position can be a plate with four sides or a pair of arms pivotal between horizontal and vertical positions.

1 Claim, 15 Drawing Figures

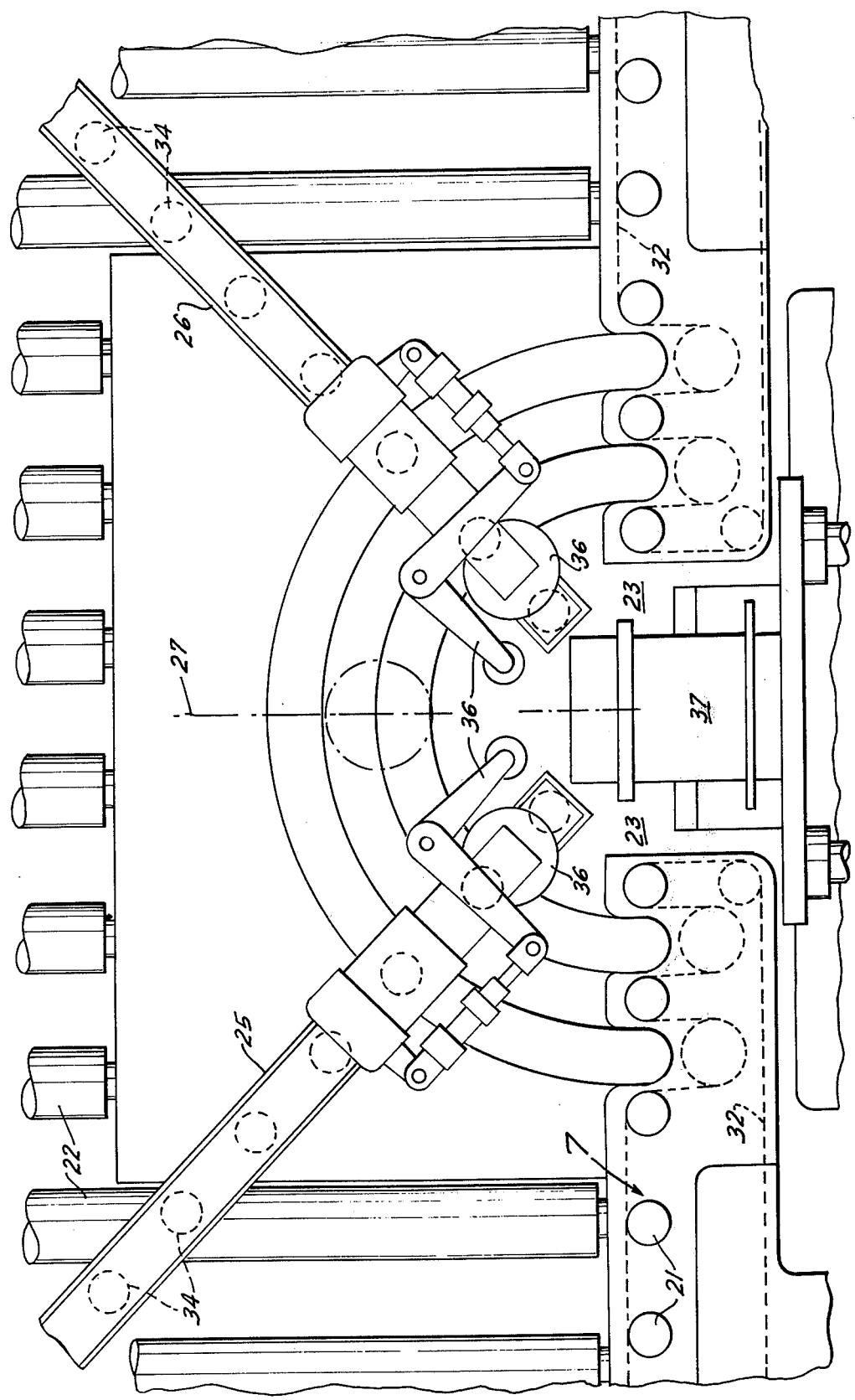

METHOD OF TREATING THE CORNERS OF PLANAR POLYGONAL WORKPIECES

This is a division of application Ser. No. 402,577, filed Oct. 1, 1973.

1. FIELD OF THE INVENTION

The present invention relates to a system for treating the corners of a planar workpiece of polygonal outline. More specifically this invention concerns a method of soldering or brazing the corners of metallic frames such as used to separate sheets of glass in thermally insulating windows or the like.

2. BACKGROUND OF THE INVENTION

In the production of metal frames used to separate the two sheets of glass used in thermally insulating glass sold under the name of Thermopane it is necessary to attach the straight hollow mitered metal bars together very securely. It is almost invariably necessary to make each thermal pane to order, that is, to a specific size required by the customer since it is impossible to cut down a finished sheet. The bars must be cut by a skilled worker and mitered accurately, which is a relatively simple operation. Then it is conventional to secure the corners together with small L-shaped reinforcements that fit inside the hollow bars. Finally each corner is soldered or brazed. This latter operation is usually carried out by pulling the assembled frame around on a large flat table and maneuvering each corner into a treatment station where it is soldered or brazed. This latter operation is difficult and takes up an inordinate amount of room.

OBJECTS OF THE INVENTION

It is therefore an object of the present invention to provide an improved system for treating the corners of a planar workpiece of polygonal outline.

Another object is the provision of a method of treating the corners of a frame such as is used in the production of thermal insulating glass.

SUMMARY OF THE INVENTION

These objects are attained according to the present invention in a system wherein the workpiece is transported standing on its edge in an upright condition along a generally horizontal guide to a treatment station provided with means for manipulating the workpiece in an upright condition to position at least one of the corners in the treatment station which is provided with a treating tool. After treatment of the corner the workpiece is set again on its edge on a downstream run of the guide which transports it away from the treatment station. In this manner the assembled frame is moved in a vertical plane so that relatively little floor space is taken up by the device. In addition such an arrangement can be employed with a workpiece of virtually any reasonable size, and it is simple to set it up for pentagonal, hexagonal, or otherwise polygonal workpieces.

In accordance with further features of this invention the manipluator is a support lying between the upstream and downstream runs of the guide and rotatable about a horizontal axis. This support has a plurality of sides corresponding to the sides of the workpiece and is operatable once the workpiece is fed into it to position the corners of this workpiece successively in the treatment station. The overall dimensions of the support are larger than the largest workpiece to be treated so that as the support is rotated through 90° the workpiece slides into the next corner of the support to expose the next corner of the workpiece in the treatment station.

According to another feature of the present invention the manipulator is a pair of arms each displaceable between a position level with or below a respective run of the guide, and a position perpendicular to the guide. In this manner the downstream arm may be lifted into a vertical position with the upstream arm down flat so that a workpiece can be moved over the arm that is down and against the up arm whereupon these arms are both pivoted toward the downstream direction through 45° to tilt the workpiece and allow its corner to be treated. Thereafter further tilting through 45° to bring the upstream arm up and the downstream arm all the way down allows the workpiece to feed out of the manipulator. Thereafter the workpiece can move into another such maniuplator for treatment of its next corner. It is also possible to flatten both arms at that time on the guides to allow the transport mechanism to move the workpiece back upstream of the manipulator, whereupon the downstream arm is again lifted and the next corner is treated. It is very simple in such an arrangement to adapt the device for the treatment of nonsquare workpieces. i.e. ones having triangular, pentagonal or other polygonal shapes.

DESCRIPTION OF THE DRAWING

The above and other objects, features and advantages of the present invention will become more readily apparent from the following description, reference being made to the accompanying drawing in which:

FIG. 7 is an enlarged-scale view of the detail indicated by arrow VII of FIG. 5;

SPECIFIC DESCRIPTION

Figure 1:
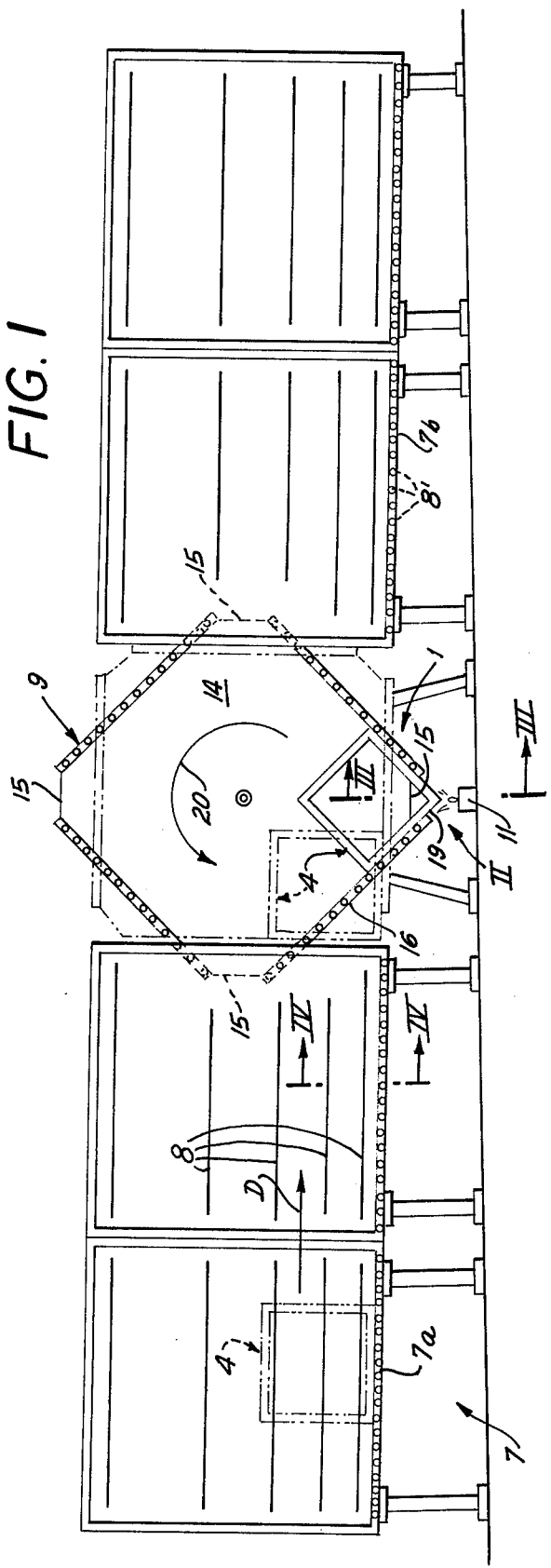
FIG. 1 is a side elevational view of a first embodiment of the apparatus according to the present invention.
Figure 4:
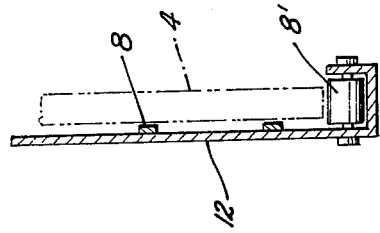
FIGS. 3 and 4 are sections taken along lines III — III and IV —IV of FIG. 1.
Figure 3:
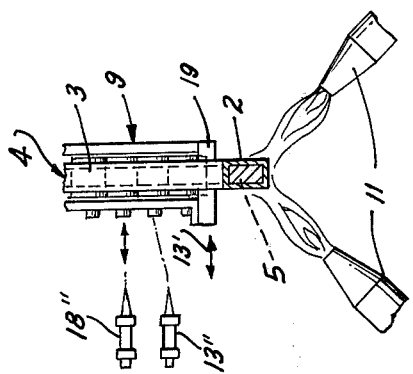
Figure 2:
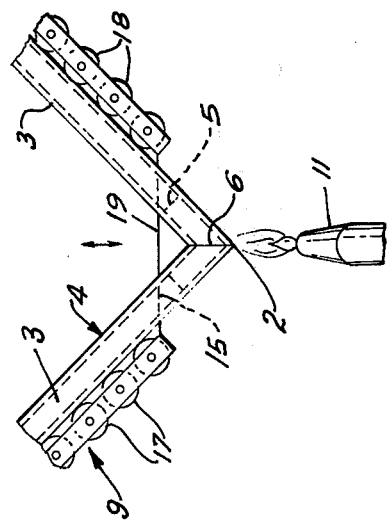
FIG. 2 is an enlarged-scale view of the detail indicated by arrow II of FIG. 1.

As shown in FIGS. 1 – 4 a workpiece 4 is formed of four identical hollow bars 3 having mitered ends 6 and fitted together by means of L-shaped reinforcements 5 into a square. This workpiece 4 is intended for use as a spacer between panes of glass in so-called Thermopane and must be soldered or brazed at its corners 2.

The apparatus comprises a guide 7 formed of an upstream stretch 7a and a downstream stretch 7b separated by a manipulating station 1 having a manipulator 9 which maneuvers the corners 2 into a treatment station 10.

The stretches 7a and 7b are formed of upright supports 12 fitted with parallel horizontal slides 8 defining a plane tilted approximately 3° to the horizontal. Rollers 8' are provided along the bottom edge of the guide 7 and are in line but define a path which is inclined from the upstream end to the downstream end so that a workpiece 4 rolls along it by the force of gravity while it leans against the slides 8.

The manipulator 9 includes a large square plate 14 with cut off corners 15 that is rotatable about a horizontal axis 13 and displaceable along this axis as shown by arrow 13'. One side of the plate 14 is provided with a row 16 of rollers 17 which are secured to the plate 14 and can be aligned with the guide 7 as shown in FIG. 1 in dot-dash lines. The other three sides of the plate 14 are provided with rows of rollers 18 that are displaceable in the direction of arrow 13' relative to the plate by means of a cylinder 18'. The rollers 17 may be driven.

The treatment station 10 has a treatment tool 11, here a pair of torches, and is provided with a clamping element 19 (see FIGS. 2 or 3) of triangular cross section. In use the manipulator 9 is placed in the position shown in FIG. 1 in dot-dash lines with the rollers 18 retracted. The workpiece 4 can then roll from the upstream stretch 7a into the manipulator, whereupon the rolls 18 are displaced by cylinder 18'' above the plate 14 and this plate is by a cylinder 13'' displaced in the direction shown by arrow 20 through 45° to slide the workpiece 4 down into the corner of the plate 14, with the corner 2 of the workpiece projecting beyond the cut off corner 15 of the manipulator 9. To effect this rotation the plate 14 is advanced slightly with rollers 17 and 18 out of the plane of the guide 7 so as to clear this guide. The clamping element 19 (see especially FIGS. 2 and 3) is then moved forward and down to hold the corner 2 firmly in place, and the torches 11 serve to solder the bars 3 together. Thereafter the clamping element 19 is withdrawn and the manipulator 9 is rotated through another 90° to position the next corner 2 of the workpiece 4 in the station 10. When all four corners 2 have been soldered the manipulator 9 is again moved into the dot-dash position, the rollers 18 are withdrawn, and the workpiece is rolled off onto the downstream guide 7b.

Figure 5:
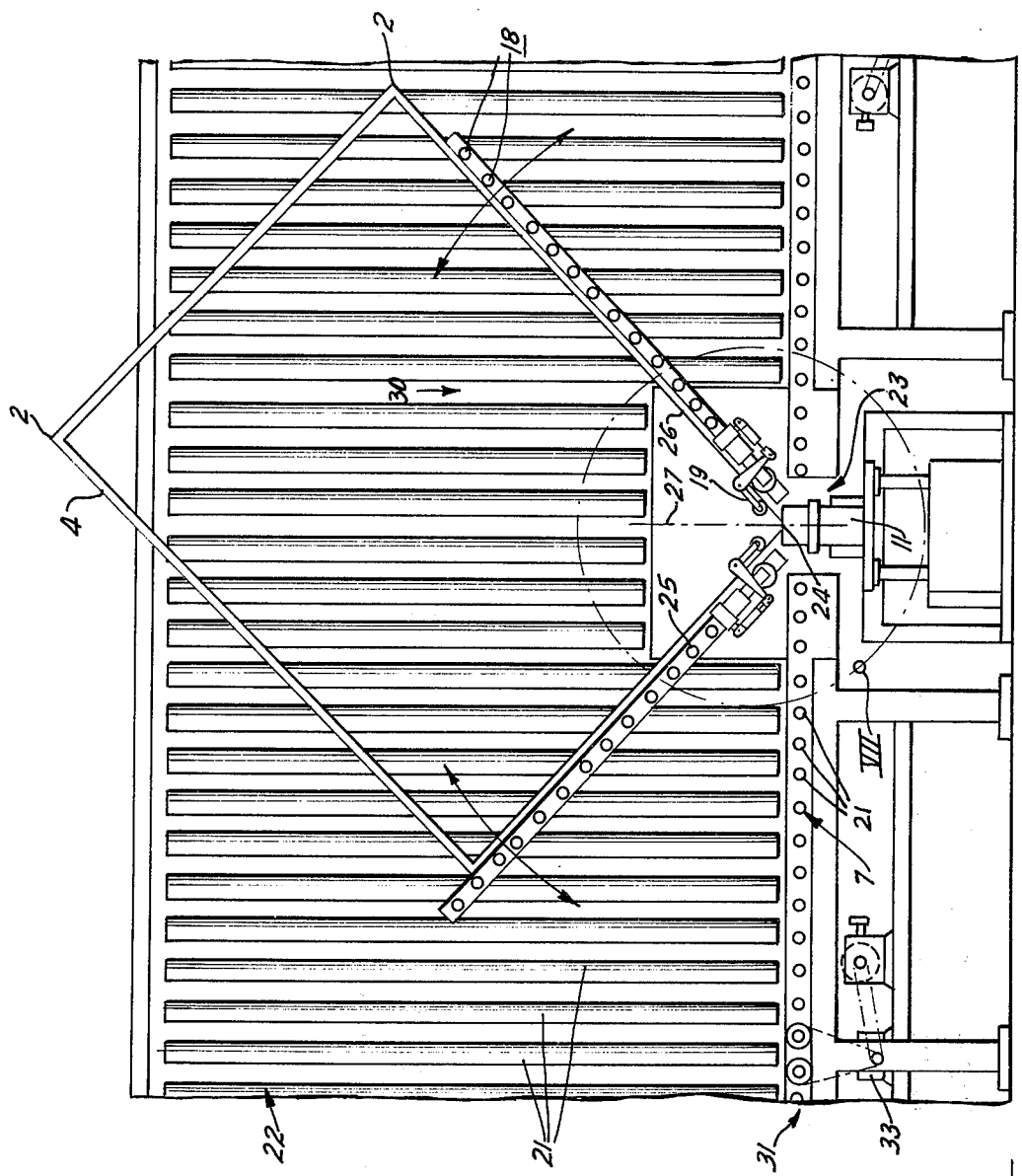
FIGS. 5 and 6 are side and end elevational views, respectively, of another embodiment of the present invention.
Figure 6:
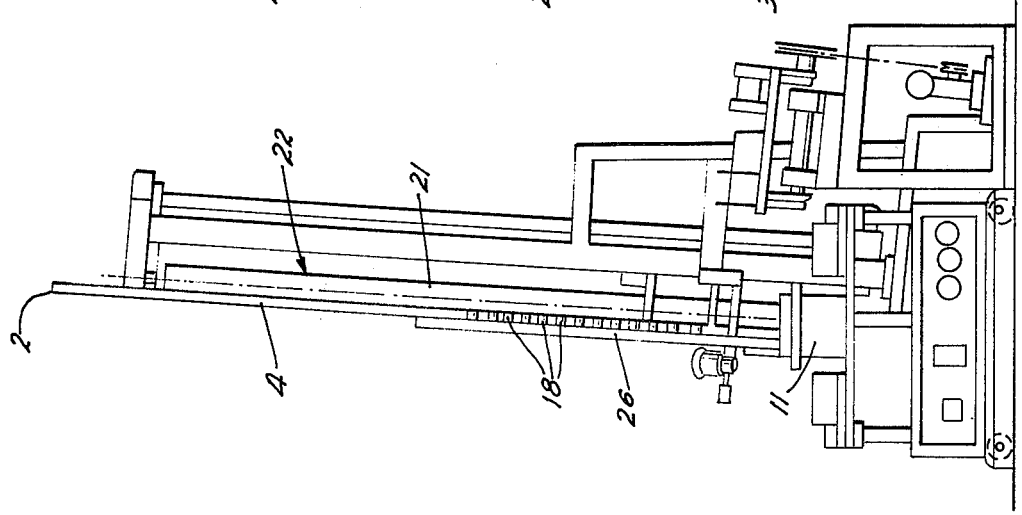

The arrangement shown in FIGS. 5–7 is similar in function to that of FIGS. 1–4, but operates with a manipulator 30 comprising a pair of independently swiveling arms 25 and 26. In addition a guide 31 is provided which comprises a plurality of rollers 21 which are rotated by belts 32 driven by motors 33 so as to advance the workpiece 4 in either direction along the guide 31. A plurality of upright parallel rollers 22 define a support plane slightly tilted from the vertical and serve to support the workpiece 4 as it is moved along the guide 31.

Each arm is provided with a plurality of rollers 34 which are interleavable with the rollers 21. The arms 25 and 26 are pivotal about an axis 24 from horizontal positions flush with the guide 31 to vertical positions lying on a plane 27 perpendicular to this guide. Each arm is swiveled by a respective motor 35 and motors 36 may be provided to rotate the rollers 34. A plate 23 is provided set into the array of rollers 22 so as to permit the various operating elements for the arms 25 and 26 to pass through the guide 31. Each arm is also provided with a hydraulically actuated clamping arrangement 36 comparable to the clamping element 19 of FIG. 1. A heated vessel 37 filled with solder is provided at the treatment station.

Figure 8A:
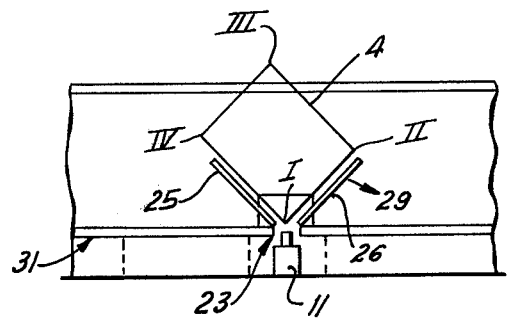
FIGS. 8A – 8D are schematic views illustrating one method of operating the device of FIGS. 5–7.
Figure 8B:
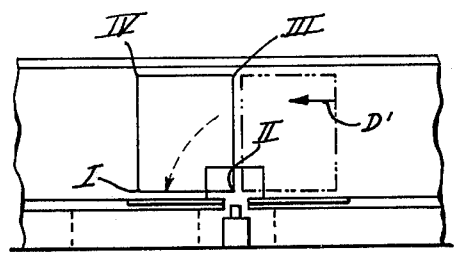
Figure 8C:
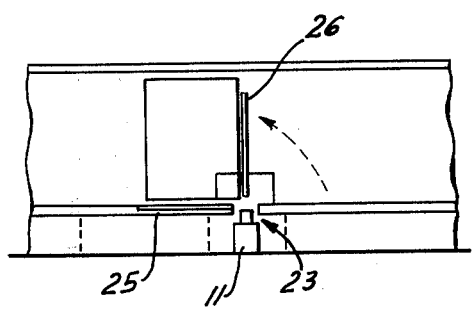
Figure 8D:
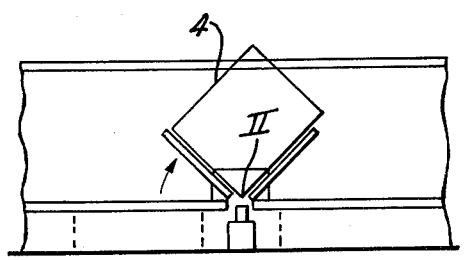
Figure 9A:
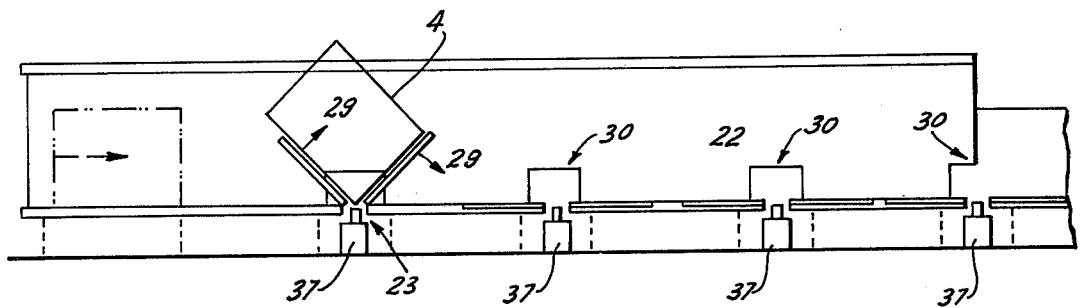
FIGS. 9A–9D are schematic views illustrating another method of operating the device of FIGS. 5–7.
Figure 9B:
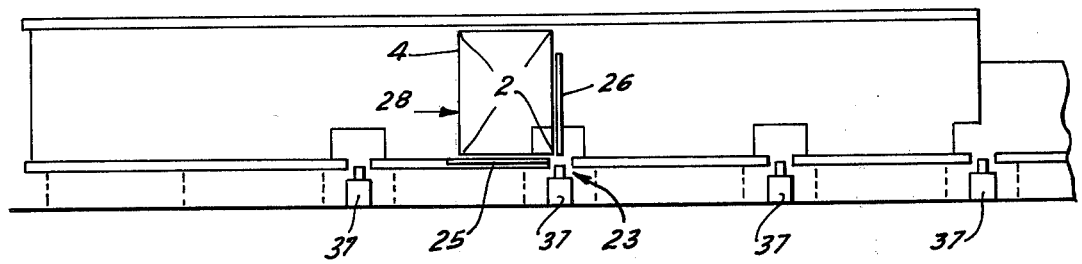
Figure 9C:
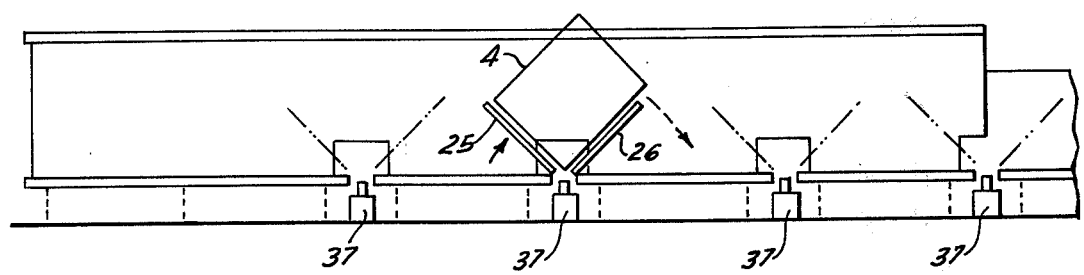
Figure 9D:
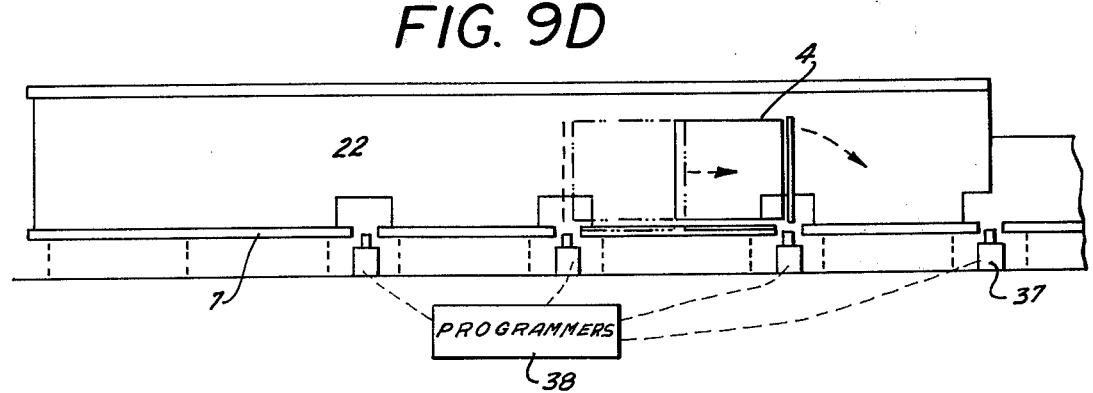

FIGS. 8A–8D show how the device can be used to treat a workpiece 4 whose corners are marked I–IV. At first the arm 26 is lifted into plane 27 and the arm 27 is flattened below the level of the rolls 21. The workpiece 4 is lifted into the position shown in FIG. 8A by rotating the arms 25 and 26 both through 45° to tip the corner I into the bath 37. Thereupon the arms are rotated again through 45° until the arm 25 is upright to stand the workpiece 4 up on the arm 26, and the arm 25 is lowered as shown in FIG. 8B while the drives are actuated to displace the workpiece back in the direction of arrow 39. The arm 26 is then lifted as shown in FIG. 8C and the workpiece is again tilted over as shown in FIG. 8D to treat the corner II. In this manner the corners are treated successively.

It is possible as shown in FIG. 9 to provide four successive manipulators 30 and treatment stations 37 on the same array of rollers 22 so as to treat the first corner of the box much as shown in FIG. 8A. Then the workpiece 4 is set down and picked up as shown in FIGS. 9B and 9C and treated in the next treatment station 37, and in the next and so on. The operations of the various drive elements are controlled by a central programmer 38 to sequence the necessary motions in the appropriate order. The two arms 25 and 26 in this arrangement can be linked together so as always to extend at 90° to each other. A blower 39 is provided downstream of each manipulator 30 to cool the freshly soldered workpiece.

I claim:
1. A method for treating a corner of a planar workpiece of polygonal outline comprising the steps of:
   standing said workpiece on its edge in an upright position;
   displacing the standing workpiece horizontally along a conveyor to a treatment location;
   tilting the standing workpiece and a portion of the conveyor at the treatment location about a horizontal axis to position a corner thereof adjacent a treatment tool;
   treating said corner with said tool by soldering the workpiece corner with said tool;
   further tilting the workpiece after treatment thereof to stand same on the conveyor downstream of said tool on an edge different from the edge the workpiece stood on before treatment; and
   displacing the workpiece in an upright condition along said portion of the conveyor back past said tool after treatment thereof.

* * * * *